May 26, 1964
K. CLUSIUS
3,134,643
PROCESS FOR THE CONCENTRATION OF ISOTOPES OF
NITROGEN AND OXYGEN IN NITRIC OXIDE
Filed April 14, 1958
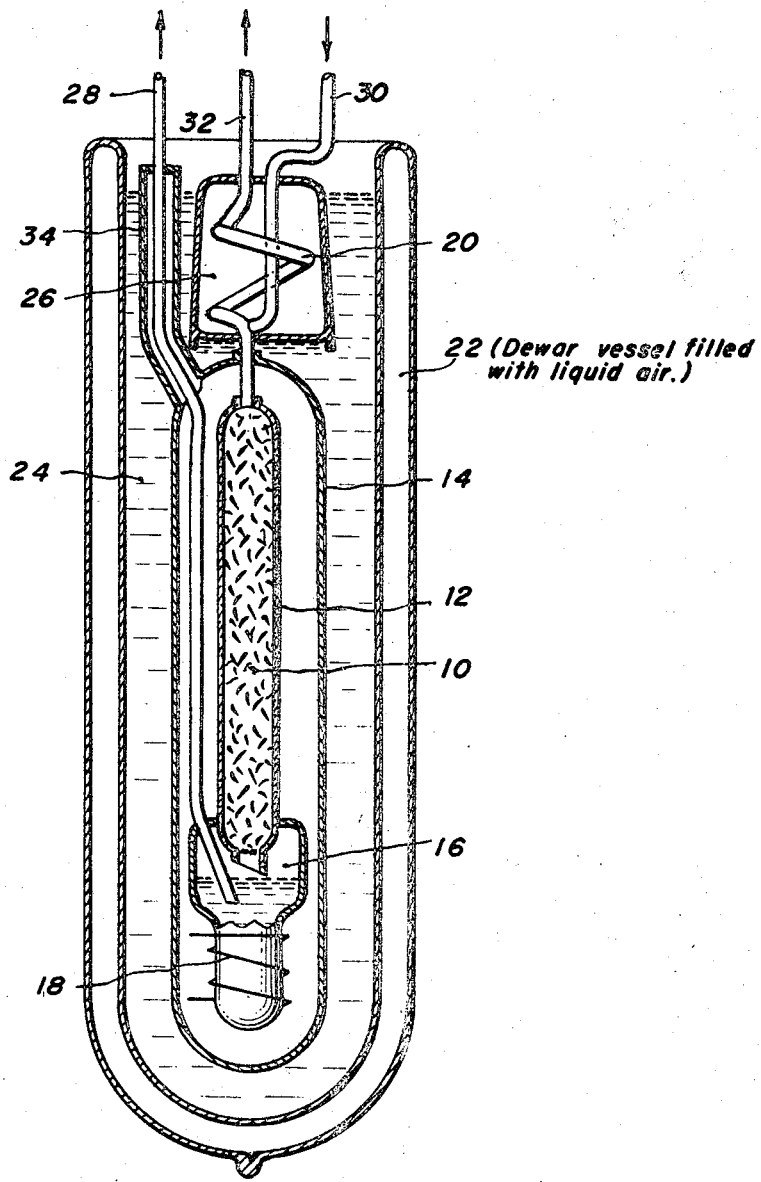
INVENTOR
KLAUS CLUSIUS
BY Wenderoth, Lind & Ponack
ATTORNEYS

United States Patent Office 3,134,643
Patented May 26, 1964

---

3,134,643
PROCESS FOR THE CONCENTRATION OF ISOTOPES OF NITROGEN AND OXYGEN IN NITRIC OXIDE
Klaus Clusius, Zurich, Switzerland, assignor to Ciba Limited, Basel, Switzerland
Filed Apr. 14, 1958, Ser. No. 728,386
Claims priority, application Switzerland Apr. 23, 1957
8 Claims. (Cl. 23—157)

This invention provides a process for the concentration of isotopes, especially for the separation of particular isotopes of nitrogen and of oxygen.

In researches in the fields of chemistry and biology the naturally occurring heavy isotope of nitrogen $^{15}N$ and also the heavy isotopes of oxygen $^{17}O$ and $^{18}O$ are of great importance for the reason that radioactive isotopes of nitrogen and of oxygen having a useful half life period are not yet available. For the concentration of isotopes various processes are available, including concentration by rectification. Difficulties are encountered in the application of the rectification process in the case of the mentioned isotopes of nitrogen and of oxygen on account of the extremely small vapour pressure differences.

These difficulties are overcome by the present invention which relates to an improvement in a process for the concentration and separation of the above-mentioned isotopes of nitrogen and oxygen, which improvement consists of the steps of:

(a) Producing nitric oxide having a low content of the desired heavy isotopes;
(b) Rectifying said nitric oxide to obtain a fraction having a higher content of said isotopes; and
(c) Recovering the nitrogen and/or oxygen from the isotope-enriched nitric oxide fraction so obtained.

The process of the present invention makes the concentration of the specified isotopes of nitrogen and of oxygen with very low expenditure and a particularly successful result possible.

According to the invention the concentration of isotopes of nitrogen and/or of oxygen is carried out by rectification with the use of nitric oxide. The nitric oxide required as starting material for the process is produced, for example, by disproportionation of dinitrogen tetroxide with water, the tetroxide being a natural source material for NO, from which the latter is obtained according to the reaction:

$$3N_2O_4 + 2H_2O = 4HNO_3 + 2NO$$

The dinitrogen tetroxide is obtained in great purity in certain processes for the production of nitric acid, by cooling nitrous gases to a low temperature.

A further advantageous modification of the process can be attained when, after rectification, the nitric oxide having a lower concentration of heavy isotopes is continuously caused to undergo an exchange reaction with nitric acid of suitable concentration, as a result of which the content of the nitric oxide in heavy isotopes to be concentrated is again brought approximately to the original starting equilibrium. This corresponds to 0.37% $^{15}N$, 0.20% $^{18}O$ and 0.04% $^{17}O$.

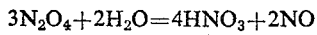
$$^{14}N^{16}O + H^{14}N^{16}O_2{}^{18}O \rightleftharpoons {}^{14}N^{18}O + H^{14}N^{16}O_3$$

The nitric oxide enriched again in this manner with isotopes from the nitric acid and heavy isotopes is then again passed to the rectification column. Advantageously the adjustment to the starting equilibrium is carried out at a temperature higher than the rectification temperature and in the region in which the nitric acid is liquid. If necessary, the adjustment of the equilibrium can take place with the use of higher nitric oxides as catalysts.

This modification of the process has the advantage that a limited quantity of nitric oxide is concerned, and replacement is only necessary of the products removed and of any slight losses in the apparatus. This continuous exchange can also be carried out instead of with nitric acid with the salts thereof or with salts of nitrous acid, the pH value of the solution being suitably selected, advantageously in the acid region.

According to the purpose of application the desired isotopes are either removed from the nitric oxide or converted into a compound adapted for such purpose. This is possible, for example, by repeated adjustment of the exchange equilibria or also, for example, by reduction of the nitric oxide, giving water on the one hand and nitrogen or ammonia on the other.

According to a further modification of the process it is possible not only to concentrate the heavy isotopes $^{15}N$, $^{17}O$ and $^{18}O$ individually in the form of the molecular types $^{15}N^{16}O$, $^{14}N^{17}O$ and $^{14}N^{18}O$. It is also possible in a further modification of the process to concentrate the molecular types $^{15}N^{17}O$ or $^{15}N^{18}O$. These molecular types are substantially absent from the starting material since the frequency of their occurrence is given by the product of the frequencies of occurrence of the individual isotopes, which is a practically negligible amount. In the present process the procedure is such that the molecular types concentrated at the heavy end of the rectification column, but containing in each case only one of the isotopes to be concentrated, are treated at a suitable, preferably elevated temperature, for example, either in the boiling vessel of the rectifier unit itself or at room temperature, with a corresponding small quantity of nitrous gases and/or nitrous nitric acid as catalyst, where upon the equilibria between the individual molecular types readjust themselves.

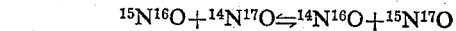
and
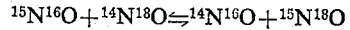

By this means molecular types are obtained which in each case contain two of the isotopes to be concentrated, that is to say for example $^{15}N^{17}O$ and $^{15}N^{18}O$, in a concentration corresponding to the concentration of the individual isotopes obtained up to this time. The equilibrium mixture of $^{14}N^{16}O$, $^{14}N^{17}O$, $^{14}N^{18}O$, $^{15}N^{16}O$, $^{15}N^{17}O$ and $^{15}N^{18}O$ may be introduced a new into a rectifying column for further separation. The nitric oxide containing in the same molecule both the heavy nitrogen and also the heavy oxygen isotopes as $^{15}N^{17}O$ and $^{15}N^{18}O$ is particularly desired for certain purposes of application.

The concentration of the isotopes of nitrogen and oxygen by rectification of nitric oxide is a process which is outstandingly favourable both in efficiency and yield. This is due to the fact that in the case of nitric oxide as compared with the other low-boiling gases there is an abnormally large vapour pressure difference between the different isotope-containing molecules. This unusually large relative vapour pressure difference, which is about 3–4 times as large as in the case of gases of similar boiling point, renders possible a concentration of the desired heavy isotopes with favourable efficiency and less expenditure than required in the rectification of the gases nitrogen and oxygen alone. A further favourable fact as regards in industrial use of the process is that the efficiency figure in the Carnot process for the gas liquefaction at the triple point of nitric oxide is half as much again higher than at the boiling point of nitrogen.

Obviously the present process is also applicable in order to obtain nitrogen and/or oxygen free from heavy isotopes.

As mentioned above, the heavy isotopes of nitrogen and of oxygen are of great importance as tracers since radioactive isotopes of nitrogen and of oxygen with a useful half life period are not yet available. Heavy nitrogen would also be of interest in reactor technique if it could be produced sufficiently cheaply.

The following examples illustrate the process of the invention. The apparatus used therein is illustrated in section in the accompanying drawing.

*Example 1*

Referring to the drawing, a glass column 12 filled with wire mesh filling bodies 10 had a diameter of 10 mm. and a length of 70 cm. It was arranged in a vacuum jacket 14. At the lower exit of the column was a boiling vessel 16 electrically heated by a heating element 18 with a consumption of 1.26 watts. At the upper end of the column was a dephlegmator 20. The whole of the above was located within a Dewar vessel 22 filled with liquid air 24. The dephlegmator was located within an immersion bell 26 being thus surrounded by cold but not liquid air. In the same way the conduit 28 for removal of the condensate, the supply conduit 30 and the withdrawal conduit 32 from the dephlegmator were led into the immersion bell or into a protective tube 34 so that they did not come into contact with the liquid air.

In the above apparatus 12 liters of gaseous nitric oxide with a content of 1.93% $^{15}N$ of the molecular compound $^{15}NO$ were condensed. In the working operation an equilibrium pressure of 210 mm. of mercury became established, corresponding to a boiling temperature under that pressure of 111.3° absolute. After 4 hours there could be drawn off continuously at the upper end a gas containing a lower proportion of $^{15}N$, in fact containing 1.24% $^{15}NO$, whereas at the lower end a $^{15}N$-concentrate containing 2.42% $^{15}NO$ was available. This process corresponds to a separation factor of 1.97.

In order to improve the heat efficiency a heat exchanger can if desired be inserted between the supply point of fresh nitric oxide and the exit of the dephlegmator for nitric oxide of reduced heavy isotope content.

*Example 2*

In the apparatus described in Example 1 ordinary nitric oxide, containing 0.37% of $^{15}NO$ was distilled. On periodic withdrawal after the attainment of equilibrium there was produced at the dephlegmator side a content of 0.24% of $^{15}NO$, whereas there could be removed from the boiling vessel a gas containing 0.48% $^{15}NO$, i.e. double the concentration.

*Example 3*

The glass column illustrated in the drawing, instead of being filled with wire mesh filling bodies was filled with spirals 2 mm. long and having a diameter of 2 mm. of stainless steel wire of 0.2 mm. diameter. By employing heating with the expenditure of 0.56 watt, at a pressure of 245 mm. of mercury (corresponding to a boiling point of 112.4° absolute), after 24 hours gas was evolved at the head of the column containing only 0.27% $^{15}N$, while the contents of the vessel had a content of 2.38% $^{15}N$. This corresponds to a separation factor of 8.9. By this change of the filling material in the glass column there was therefore a considerably higher separation efficiency than using wire mesh filling bodies as in Examples 1 and 2.

What is claimed is:

1. In a process for the concentration and separation of the heavy nitrogen isotope $^{15}N$ by enriching a compound of nitrogen and oxygen in the heavy isotopic molecules thereof and subsequent recovery of the heavy nitrogen isotope therefrom, the improvement which comprises condensing with liquid air nitric oxide having a low content of $^{15}NO$, rectifying said nitric oxide at a pressure of about 210 mm. of mercury and at a temperature of about 111.3° absolute, and separately collecting a fraction having an increased content of $^{15}NO$.

2. In a process for the concentration and separation of the heavy nitrogen isotope $^{15}N$ by enriching a compound of nitrogen and oxygen in the heavy isotopic molecules thereof and subsequent recovery of the heavy nitrogen isotope therefrom, the improvement which comprises condensing with liquid air nitric oxide having a low content of $^{15}NO$, rectifying said nitric oxide at a pressure of about 245 mm. of mercury and at a temperature of about 112.4° absolute, and separately collecting a fraction having an increased content of $^{15}NO$.

3. In the concentration of rare natural isotopes, the improvement wherein liquid nitric oxide, having a low content of at least one member selected from the group consisting of $^{15}N$, $^{17}O$ and $^{18}O$, is rectified by fractional distillation.

4. In a process for the concentration and separation of the heavy isotopes $^{15}N$, $^{17}O$ and $^{18}O$ by enriching a compound of nitrogen and oxygen in the heavy isotopic molecules thereof and subsequent recovery of the heavy isotopes therefrom, the improvement comprising rectifying liquid nitric oxide by fractional distillation, the nitric oxide having been produced from natural source material and thus having the naturally occurring low content of said heavy isotopes, and separately collecting during rectification a nitric oxide fraction having an increased content of said heavy isotopes.

5. In a process for the concentration and separation of the heavy isotopes $^{15}N$, $^{17}O$ and $^{18}O$, by enriching a first compound of nitrogen and oxygen in the heavy isotopic molecules thereof, converting the enriched compound to another enriched compound containing said heavy isotopes, and subsequently recovering the heavy isotopes therefrom, the improvement comprising rectifying liquid nitric oxide by fractional distillation, the nitric oxide having been produced from natural source material and thus having the naturally occurring low content of said heavy isotopes, as the first compound, and separately collecting during rectification a nitric oxide fraction having an increased content of said heavy isotopes.

6. In a process for the concentration and separation of the heavy isotopes $^{15}N$, $^{17}O$ and $^{18}O$ by enriching a compound of nitrogen and oxygen in the heavy isotopic molecules thereof and subsequent recovery of the heavy isotopes therefrom, the improvement comprising (a) rectifying liquid nitric oxide by fractional distillation, the nitric oxide being that produced from natural source material and thus having the naturally occurring low content of said heavy isotopes, (b) separately collecting during rectification a nitric oxide fraction having an increased content of said heavy isotopes, (c) contacting the nitric oxide fraction having an increased content of said heavy isotopes with nitrous nitric acid, as catalyst, whereby equilibrium in said nitric oxide fraction having an increased content of said heavy isotopes is adjusted according to the equilibria $$^{15}N^{16}O + ^{14}N^{17}O \rightleftharpoons ^{14}N^{16}O + ^{15}N^{17}O$$
$$^{15}N^{16}O + ^{14}N^{18}O \rightleftharpoons ^{14}N^{16}O + ^{15}N^{18}O$$

(d) rectifying liquid nitric oxide by fractional distillation the nitric oxide being that produced from step c, and (e) separately collecting during the latter rectification a nitric oxide fraction having a further increased content of said heavy isotopes.

7. In a process for the concentration and separation of the heavy isotopes $^{15}N$, $^{17}O$ and $^{18}O$ by enriching a compound of nitrogen and oxygen in the heavy isotopic molecules thereof and subsequent recovery of the heavy isotopes therefrom, the improvement comprising (a) rectifying liquid nitric oxide by fractional distillation, the nitric oxide being that produced from natural source material and thus having the naturally occurring low content of said heavy isotopes, (b) separately collecting during rectification a nitric oxide fraction having an increased content of said heavy isotopes, (c) contacting the nitric oxide fraction having an increased content of said heavy isotopes at room temperature with nitrous nitric acid, as catalyst, whereby equilibrium in said nitric oxide fraction having an increased content of said heavy isotopes is adjusted according to the equilibria $$^{15}N^{16}O + {}^{14}N^{17}O \rightleftharpoons {}^{14}N^{16}O + {}^{15}N^{17}O$$
$$^{15}N^{16}O + {}^{14}N^{18}O \rightleftharpoons {}^{14}N^{16}O + {}^{15}N^{18}O$$

(d) rectifying liquid nitric oxide by fractional distillation, the nitric oxide being that produced from step c, and (e) separately collecting during the latter rectification a nitric oxide fraction having a further increased content of said heavy isotopes.

8. A distillation process for concentrating rare natural isotopes which comprises fractionating liquid nitric oxide having a low content of at least one member selected from the group consisting of $^{15}N$, $^{17}O$ and $^{18}O$.

References Cited in the file of this patent

UNITED STATES PATENTS

| | | |
|---|---|---|
| 2,218,342 | Pegram | Oct. 15, 1940 |
| 2,268,134 | Clusius | Dec. 30, 1941 |
| 2,780,526 | Fleck | Feb. 5, 1957 |
| 2,923,601 | Taylor et al. | Feb. 2, 1960 |

OTHER REFERENCES

Taylor et al. in "J. Chem. Physics," vol. 16, 1948, page 635.

Begun in "J. Chem. Physics," vol. 25, 1956, pages 1279–1280.

Leifer in "J. Chem. Physics," vol. 8, 1940, pages 301 to 303.

Chemical Abstracts, 1930, pp. 5605, "The Isotopes of Nitrogen, Mass 15, and Oxygen, Masses 18 and 17, and Their Abundance."

Chemical Abstracts, 1944, 5142, "The Separation of the O Isotopes by the Distillation of Water."

AEC Pub., "Feasibility of Large Scale N–15 Production for Nuclear Reactors," K–1232, Aug. 17, 1955.